Patented Jan. 15, 1952

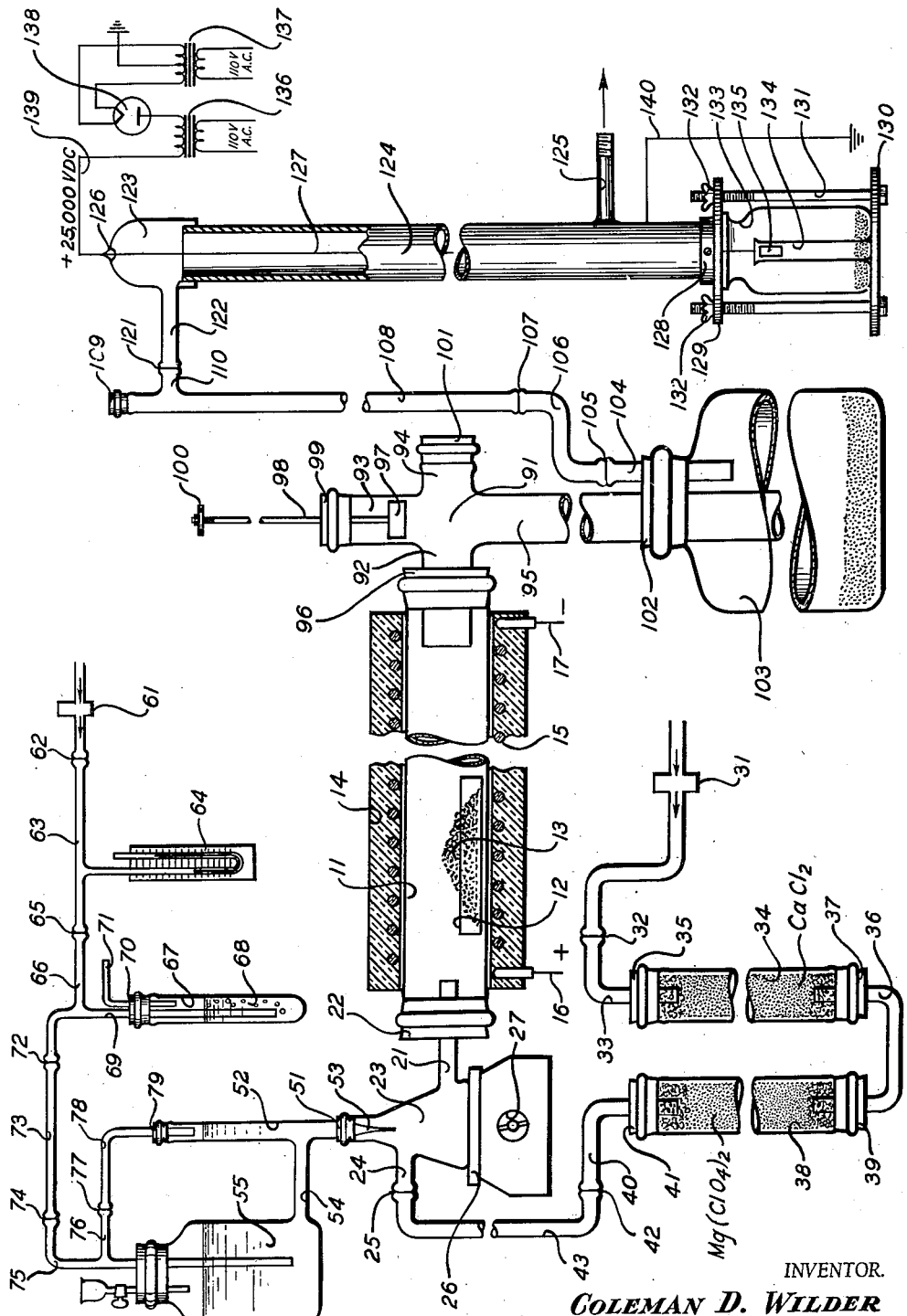

2,582,941

UNITED STATES PATENT OFFICE 2,582,941

PROCESSES OF PRODUCING URANIUM CHLORIDES

Coleman D. Wilder, Oak Ridge, Tenn., assignor to the United States of America as represented by the United States Atomic Energy Commission Application October 12, 1944, Serial No. 558,452

8 Claims. (Cl. 23—14.5)

This invention relates to the manufacture of a uranium chloride product, and more particularly to the manufacture of uranium pentachloride alone or containing a substantial proportion of uranium hexachloride, by a process for chlorinating various compositions comprising uranium compounds with carbon tetrachloride vapor carried by a swift current of air.

This invention has for an object the rapid production of a uranium chloride product comprising a large proportion of uranium pentachloride and various proportions of uranium hexachloride.

A further object of the invention is to provide a high-yield, low-loss process for the production of uranium pentachloride which is economical and suitable for large scale production of said chloride.

A further object of the invention is to provide a process for the production of uranium pentachloride and more or less uranium hexachloride by means of a continuous reaction wherein various compounds of uranium are reacted with vaporous carbon tetrachloride which is carried by a rapid current of air.

A further object of the invention is to provide a process for the production of uranium pentachloride and more or less uranium hexachloride wherein a large effective reaction surface and maximum heat transfer is obtained through employment of a high velocity of the chlorinating mixture of carbon tetrachloride and air.

A process has now been discovered and apparatus designed for treating uranium compounds, especially oxides and lower chlorides, with carbon tetrachloride in a swift current of air, whereby uranium pentachloride is formed, vaporized, rapidly swept out of the reaction zone, and quickly cooled.

How the foregoing objects and related ends are accomplished will be apparent from the following exposition, in which are disclosed the principle, the organization and divers embodiments of the invention, including the best mode contemplated for carrying out the same. Parts are given by weight throughout the written description, which is amplified by the accompanying drawing of the apparatus in which the single figure is a diagrammatic side elevation view, partly in section, with some parts shown in conventionalized form and some parts over-scale for clarity.

In its broad aspect, the procedure comprehended by the present invention comprises dissipating carbon tetrachloride vapor in a speedy stream of dry air, passing the resultant mixture over an uranium compound heated to the neighborhood of 550° C. whereby uranium pentachloride is formed and vaporized into the current, moving the resulting vaporous mixture into a collecting receptacle so that most of the uranium chloride will condense and settle out, and sending the gas stream through a dust separator to strip it of the residual uranium-containing particles.

The apparatus employed comprises a device for supplying carbon tetrachloride, a device for supplying dry air, a flash boiler in which the carbon tetrachloride is vaporized and mixed with the air, a reaction chamber in which the air-carbon tetrachloride admixture is reacted with the uranium-containing raw material, a heater about the reaction chamber, a delivery duct for conducting the vaporous reaction product from the reaction chamber to collecting means, a receiver for collecting the bulk of the principal product (uranium pentachloride, with or without uranium hexachloride) and an electrostatic separator for removing the remainder of the reaction product that, in dust-like form, has been carried through the receiver by the air stream.

Referring now to the drawing, there is shown near the center a reaction vessel which comprises a horizontal heat resistant cylindrical tube 11, constructed of Pyrex glass or the like, about 4 inches in diameter and about 4 feet long. Located in the tube 11 is an open-ended boat or tray 12 containing a charge 13 of uranium compound. For raw material such as uranium trioxide or uranium tetrachloride, a charge of 10 to 15 kg. is commonly used. A heater comprising a refractory shell 14 and a wound electrical resistance heating element 15 having two leads 16 and 17 surrounds the tube 11. A tube 21 extends through a plug 22 of some heat resistant material, such as asbestos, into the interior of the tube 11 at its adit end, to provide ingress for the gases utilized in the treatment of the source material. An iron-constantan thermocouple (not shown), inserted between the heater and the tube 11, is used to measure the furnace temperature. The plug 22 is sealed to the tubes 11 and 21 in a gastight manner by means of water glass or the like.

The gases passed into the reaction chamber through the tube 21 include carbon tetrachloride vapor, which has been thoroughly mixed with air in a flash boiler 23, of which the tube 21 is an extension. The flash boiler is preferably heated by means of an electrically operated hot plate 26 controlled by a switch 27. The air enters the boiler through an extension tube 24 which is connected to a source of supply at the joint 25.

Ordinarily, the air is taken from an air pressure line conventionally represented at 31. The air passes through a joint 32 and line 33 to a drying device 34 comprising an open-ended cylinder filled with calcium chloride. The line 33 extends through a plug 35 which seals the adit end of the drying device 34. The air leaves this device through a line 36 extending through a plug 37 sealed in the exit end of the device 34. The line 36 conducts the air into a second and similar drying device 38 comprising an open-ended cylinder filled with anhydrous magnesium perchlorate. The line 36 extends through a plug 39 sealed in the adit end of the drier 38. The air leaves the exit end of this device through a line 40 which extends through a plug 41 sealed in the exit end of the drier 38. The line 40 is connected by means of a joint 42, with a line 43, which in turn is connected with the extension 24 at the joint 25.

Extending into the boiler 23 through a gastight plug 51 is a carbon tetrachloride feeder tube 52, having on its end inside the boiler a capillary nozzle 53. The tube 52 constitutes a part of a carbon tetrachloride supplying device comprising a reservoir 55 and a tube 54 joining these parts. The capillary nozzle 53 is of such dimensions that a considerable pressure is necessary to force the carbon tetrachloride therefrom in the desired amounts. Air pressure is utilized for this purpose. It is supplied from a source of air pressure shown conventionally at 61. The air from this source is supplied through a joint 62 to the line 63, which has, as a side arm, a conventional mercury manometer 64 for indicating the air pressure. The line 63 is connected through a joint 65 to a line 66 which incorporates a pressure regulating device for maintaining constantly and accurately a predetermined pressure on the body of carbon tetrachloride in the reservoir 55 and appurtenant parts of the carbon tetrachloride feeder. This pressure regulating device comprises a closed bottom cylinder 67 containing a body 68 of sulfuric acid, into which a side tube 69 from the line 66 extends. A plug 70 through which the tube 69 extends, closes the open top end of the cylinder 67 in a gastight manner. Any air passing downwardly through the tube 69 bubbles up through the body 68 of the sulfuric acid and out through a vent tube 71 which extends through the plug 70 into the free space above the sulfuric acid in the cylinder 67. The cylinder 67 is arranged for sliding movement along the tube 69 so that the head of sulfuric acid, through which air can escape, can be controlled. This pressure regulating device provides a very satisfactory arrangement for maintaining a definite uniform pressure on the carbon tetrachloride supply. The line 66 is connected through a joint 72, a line 73 and a joint 74 to a line 75 which extends into the interior of the reservoir 55. In order to equalize the pressure between the reservoir 55 and the tube 52, a side arm 76 of the line 75 is connected through a joint 77 to a line 78 which extends through a plug 79 into the interior of the tube 52.

At the exit end of the tube 11 is a two-inch glass cross 91 having arms 92, 93, 94 and 95. The arm 92 extends into the tube 11 through a plug 96 of some heat-resistant material such as asbestos, and this plug is sealed to the tube 11 and arm 92 in a gastight manner by means of water glass or similar luting compound. To prevent clogging of the passage for the reaction gases and to free the central portion of the cross 91 and its arm 95 from any material which might accumulate on their interior surfaces during operation of the apparatus, a scraper 97 carried on a rod 98 is provided. This rod is slidably and rotatably mounted in a plug 99, made of rubber or the like, which closes the arm 93 about the rod in a gastight manner. A hand wheel 100 fixed on the rod 98 serves as a means for manipulating the scraper. A simple plug 101 of rubber or the like closes the arm 94 in a gastight manner.

The arm 95 extends through a plug 102 in the mouth of a large receiver 103, to a point near its center. Suitably the receiver is constructed of glass or other chlorine-resistant material, and has a capacity of about five gallons. The reaction gases pass down arm 95 into the receiver 103 where the bulk of the uranium pentachloride settles out. The gas from which this material is separated in the receiver, escapes through a vent tube 104 also extending through the plug 102. The escaping gas passes through a joint 105, a line 106, a joint 107, a line 108, and a side arm 110 for delivery to a device for removing the last dust-like traces of uranium compound therefrom. Access to the principal part of the line 108 for cleaning purposes is gained by removing a plug 109, thereby avoiding dismantlement of the apparatus.

Usually, some of the uranium pentachloride is carried out of the receiver 103 by the stream of gas passing therethrough. This transported material is in the form of a powder that does not settle satisfactorily and is difficult to collect. Preferably, it is recovered by a fume remover of the electrostatic type. These devices (commonly referred to as "Cottrell precipitators") are well known in the art and need not be illustrated or described in great detail. As indicated in the drawing, the gas containing the fine particles passes from the arm 110 into a dust collector at a joint 121. The gas flows through a tube 122, a cap 123, a tube 124 where it is freed from uranium chloride, and a tube 125 to a flue (not shown) for disposal or further use.

The cap 123 serves as an insulator and is normally constructed of some plastic or ceramic material, for example glass. The cap is cemented in a gastight manner to the tube 124. This tube, which is one of the electrodes of the separator, must be electrically conducting and is usually made of brass, but other metals, for example stainless steel, may be employed if desired. Extending through a seal 126 in the cap 123 is a central wire 127, preferably of Nichrome or similar metal, which serves as the other electrode of the separator. The lower end of the tube 124 is fitted with and sealed in a gastight manner to a collar 128 bearing a flange 129. This collar piece is preferably made of metal, for example stainless steel.

A frame comprising a bottom plate 130, the flange 129, and a suitable series of bolts such as 131 together with their respective thumb nuts 132, holds a jar 133 with its mouth against the underside of the flange 129 in a gastight manner. In order to insure proper insulation and spacing of the wire 127 within the tube 124, there is a centrally located well 134, of glass or the like, cemented to the bottom of the jar 133. Located in this well and suspended by the wire 127 is a heavy weight 135, of lead or the like. This weight is free to move vertically so that the same tension of the wire is maintained even though the wire may expand or contract for some reason such as temperature change.

Electrical connections for impressing voltages between the tube 124 and the wire 127 comprise a high-potential conductor 139 and a ground wire 140. The separator operates on 25,000 volts D. C., supplied as indicated in the wiring diagram by two 110-volt A. C. transformers 136 and 137 and a rectifying device 138.

In moving downwardly in the precipitator, the finely divided uranium chloride particles become electrically charged in the field existing between the wire 127 and the tube 124 and move outwardly, separating from the fluid stream and depositing on the interior surface of the tube 124 in accordance with the well-known operation of these devices. From this surface the particles drop, upon jarring or scraping if necessary, into the jar 133, from which they are removed from time to time for suitable processing.

Considering now the mode of operation, a charge of material is inserted in the tube 11, preferably after being placed in a suitable tray, and the flash boiler is then connected as shown in the drawings. A current of air from the source 31 is then passed through the driers 34 and 38, the flash boiler 23, the reaction chamber in the tube 11, the arm 92, the cross 91, the receiver 103, the vent line comprising parts 104, 106, 108 and 110, the tube 122, the cap 123, the precipitating tube 124, the jar 133, and the extension 125.

When the charge is at reaction temperature, pressure is applied from the source 61 to the carbon tetrachloride in the capillary nozzle 53, causing it to drop into the boiler 23 where it is vaporized and intermingled with the previously described air stream, whereby it is passed over the charge of uranium compound. The passage of the air-carbon tetrachloride mixture causes the formation of uranium chloride, which vaporized into the gas stream and is carried along the previously described course thereby. Upon reaching the cooler portions of the apparatus, the uranium chloride condenses and the great bulk of its settles in the receiver 103. Enough of the material remains as a very fine suspension of particles in the gases to make further recovery worthwhile, and this material is removed from the gas stream as it passes through the electrostatic precipitator.

The invention will be further understood from the consideration of the following specific examples.

Example I

The temperature of the reaction zone was raised to 550° C. and a charge of uranium trioxide ($UO_3$) placed therein. The material charged had a purity of 99.2% and contained neither tetravalent uranium nor chlorine. The reaction chamber was promptly closed and a mixture of air and carbon tetrachloride vapor passed rapidly over the surface of the charge. The air was taken from a pressure line and dried by passage through calcium chloride and anhydrous magnesium perchlorate in the order named, before being introduced into the reaction chamber.

The charge first changed to a gray-black color, resembling somewhat uranous-uranic oxide ($U_3O_8$), and then a mat of yellow needle-like crystals formed over its whole surface. In a short time, the gray-black color of the main body of the material and the yellow color of the surface layer disappeared with the formation of a jet-black material, thereupon brown fumes commenced to form. The reaction mass at this stage seemed to be a mixture of a liquid and solid. The brown fumes condensed in the receiver in the form of a fine brown powder. The treatment was continued until the reaction mass had disappeared from the reaction chamber. Most of the reaction product was a brown powder which collected in the receiver, but a small amount of a black crystalline substance comprising substantially $UCl_4$ deposited at that end of the reaction chamber that joined the collector. The brown powder was very fine and gave an analysis of hexavalent uranium 27.1%, tetravalent uranium 29.5% and chlorine 41%. In this instance the analysis was made very promptly and it is possible that there may have been some condensed carbon tetrachloride mixed with the brown powder.

In this example and in subsequent examples, it will be noted that the results of analysis are reported in terms of percentages of hexavalent and tetravalent uranium. It will be understood that this method of reporting is used because the procedure of analysis for $UCl_5$ involves splitting the uranium pentachloride product into a hexavalent and tetravalent uranium compound and determining the proportions of the two. From consideration of relative proportions, 27.1% hexavalent uranium and 29.5% tetravalent uranium and 41% chlorine in Example I, it will be seen that the product has the empirical formula $UCl_{4.85}$ and comprises approximately 85% uranium pentachloride and 15% uranium tetrachloride.

Example II

The temperature of the reaction zone was raised to 550° C. and a charge of uranous-uranic oxide ($U_3O_8$) placed therein. The starting material had a purity of 99.8% and contained no chlorine. It had a hexavalent uranium to tetravalent uranium ratio of 2.01. The reaction chamber was closed and a mixture of air and carbon tetrachloride vapor passed swiftly therethrough as described in Example I. The first noticeable color change, as the reaction proceeded, was the formation of yellow needle-like crystals on the surface of the reaction mass. These needles later disappeared, leaving a black, molten mass, similar to that formed when uranium trioxide was the starting oxide. Some white fumes formed early in the reaction. As the yellow crystals disappeared, brown fumes were given off and these were collected as a brown powder deposit in the receiver. Some of the brown material deposited immediately after leaving the reaction tube and the delivery tube had to be tapped to cause it to fall into the receiver.

For a short period after the brown fumes had begun to come off, the air and carbon tetrachloride were stopped and chlorine gas (alone) passed through the reaction chamber. After about five minutes under these conditions, the reaction stopped, no more brown powder being collected. Thereafter the reaction was allowed to proceed as previously described, with the change that small amount of chlorine was mixed with the air and carbon tetrachloride. This seemed to cause a heavier cloud of brown fumes to come from the furnace and the material collected in the receiver was crystalline.

The product collected gave an analysis of hexavalent uranium 29.2%, tetravalent uranium 20.4% and chlorine 37.8%, i. e. the empirical formula was $UCl_{5.11}$ indicating that the product was 89% uranium pentachloride and 11% uranium hexachloride. The product analyzed was damp with carbon tetrachloride.

*Example III*

A charge of 4.5 kilograms of uranium trioxide was placed in the reaction chamber at normal room temperature and the temperature raised to 550° C. A speedy current of air containing carbon tetrachloride vapor was then passed over the heated material. The air was dried by passage through calcium chloride and anhydrous magnesium perchlorate in series, and passed into the furnace at the rate of 100 liters per hour. The carbon tetrachloride vapor was admixed with the air and passed into the furnace at the rate of 5 cc. (liquid) per minute. The product was so fine a powder that great difficulty was encountered in collecting it.

At one time the air was shut off for a short period. This caused the product to settle better, but the rate of its formation appeared to be much slower. The product collected was definitely wet with carbon tetrachloride, showing that an excess had been incorporated in the air stream. Some uranium tetrachloride condensed in the cool portion of the reaction tube and caused clogging difficulties. The material collected in the main receiver gave an analysis of hexavalent uranium 23.8%, tetravalent uranium 33.9% and chlorine 41.6%, ($UCl_{4.83}$). Additional material collected in the dust collector had an analysis of hexavalent uranium 33.2% tetravalent uranium 26.1% and chlorine 37.1%, ($UCl_{4.20}$).

*Example IV*

The procedure of Example III was repeated using a charge of uranium trioxide. Air was continuously forced through the apparatus at the rate of 150 liters per hour, the air being admixed with the vapor of carbon tetrachloride introduced at the rate of 345 cc. (liquid) per hour. The temperature during the run was maintained within the range 550° to 560° C. The run continued for 70 hours. The cross at the end of the reaction vessel was scraped every six hours. No uranium tetrachloride was deposited within the reaction chamber. A yield of 1 gram of uranium pentachloride was obtained for each 4.31 grams of carbon tetrachloride used.

*Example V*

The procedure of Example III was repeated using a charge of 8 kilograms of uranous-uranic oxide ($U_3O_8$) and a temperature of 540° to 560° C. Air was passed over the charge at the rate of 130 liters per hour. Carbon tetrachloride was mixed with the air, before its introduction into the reaction zone, at the rate of 6 cc. (liquid) per minute. The reaction was continued for 63 hours. Uranium pentachloride was produced at the rate of 125 grams per hour.

*Example VI*

The procedure of Example III was repeated using a charge of 6 kilograms of a mixture of uranium pentachloride and uranium tetrachloride having an analysis of hexavalent uranium 6.6%, tetravalent uranium 56.1% and chlorine 31%. Air was passed over the charge at the rate of 180 liters per hour. Carbon tetrachloride was mixed therewith, before entry into the heated zone, at the rate of 6 cc. (liquid) per minute. The reaction was continued for 38 hours. Uranium pentachloride was produced at the rate of 236 grams per hour.

*Example VII*

The procedure of Example III was repeated using a charge of 8 kilograms of a mixture of uranium pentachloride and uranium tetrachloride, as described in Example VI. Air containing a small amount of chlorine was passed over the charge at the rate of 225 liters per hour. Carbon tetrachloride was mixed therewith at the rate of 6 cc. (liquid) per minute as it entered the reaction vessel. The reaction was continued for 13 hours. Uranium pentachloride was produced at the rate of 369 grams per hour.

*Example VIII*

The procedure of Example III was repeated using a charge of 8 kilograms of the mixture of uranium tetrachloride and uranium pentachloride described in Example VI. Air having carbon tetrachloride mixed therewith at the rate of 6 cc. (liquid) per minute as it entered the reaction vessel, was passed over the charge at the rate of 300 liters per hour. The reaction was continued for 14 hours. Uranium pentachloride was produced at the rate of 286 grams per hour. Apparently the higher rate of formation was due to the faster flow of air.

*Example IX*

The procedure of Example III was repeated using a charge of 8 kilograms of uranium tetrachloride including some uranium pentachloride and having a slight amount of impurities, and having an analysis of hexavalent uranium 0.7%, tetravalent uranium 62.5% and chlorine 35.1%. Air having carbon tetrachloride vapor mixed therewith at the rate of 6 cc. (liquid) per minute as it entered the reaction tube, was passed over the charge at the rate of 373 liters per hour. The reaction was continued for 7 hours. Uranium pentachloride was produced at the rate of 260 grams per hour. No trouble was caused by the starting material being contaminated, and the contaminating substances were not found in the final product.

*Example X*

The procedure of Example III was repeated using a temperature of 540° C. and a charge of about 10 kilograms of a 50:50 mixture of uranium dioxide and uranium tetrachloride. Air, at the rate of 50 liters per hour, was passed through the reaction cylinder and allowed to escape at the delivery end thereof during the two hours required to bring the starting material up to the operating temperature. A vigorous stream of carbon dioxide was passed through the collector system while the reactor was being raised to reaction temperature, in order to remove any absorbed moisture. The carbon dioxide passed through this part of the apparatus in a direction opposite to the course of the laden reaction gases, and was allowed to escape at the cross on the end of the reaction tube. Air was then mixed with carbon tetrachloride vapor at the rate of 6 cc. (liquid) per minute, and passed over the charge at the rate of 100 liters per hour. A composition comprising about 40% uranium pentachloride was produced and separated from the air current in the receiver at the rate of 256 grams per hour.

Example XI

The procedure of Example X was repeated using a charge of 10 kilograms of a 50:50 mixture of uranium dioxide and uranium tetrachloride. Air was passed over the charge at the rate of 250 liters per hour. Carbon tetrachloride was mixed therewith, before entering the reaction zone, at the rate of 6 cc. (liquid) per minute. A composition comprising about 98% uranium pentachloride and 2% uranium hexachloride was produced at the rate of 225 grams per hour.

Example XII

The procedure of Example X was repeated. Air was passed over the charge at the rate of 400 liters per hour. Carbon tetrachloride was mixed with the air at the rate of 6.0 to 2.5 cc. (liquid) per minute as it entered the reaction tube. A composition comprising about 68% uranium pentachloride and 32% uranium hexachloride was produced at the rate of 88 grams per hour.

Example XIII

The procedure of Example X was repeated. Air having mixed therewith carbon tetrachloride at the rate of 7.5 cc. (liquid) per minute, was passed over the charge at the rate of 250 liters per hour. Uranium pentachloride was produced at the rate of 155 grams per hour.

Example XIV

The procedure of Example X was repeated. Air was passed over the charge at the rate of 250 liters per hour. Carbon tetrachloride was mixed with the air, immediately before it entered the reaction vessel, at the rate of 8.2 cc. (liquid) per minute. Uranium pentachloride was produced at the rate of 145 grams per hour.

Many compounds or mixtures of compounds of uranium may be used as the source of uranium with satisfactory results. Compounds such as uranium dioxide, uranium trioxide, uranous-uranic oxide, uranium tetraoxide and uranium tetrachloride, being especially suitable for the reaction and readily available, are generally used. The oxychlorides, uranous oxychloride ($UOCl_2$) and uranyl chloride ($UO_2Cl_2$) are also converted satisfactorily. The charge generally disappears completely when it is made up of the aforementioned materials.

Air from an ordinary compressed air line has been found suitable. The air may be dried in any suitable manner. The calcium chloride and magnesium perchlorate cylinders described have been used for convenience. Equivalent drying means and arrangements will be obvious to those skilled in the art, after consideration of the foregoing description.

The indications are that the faster the flow of air, the better the yield of uranium pentachloride obtained. The formation of yellow crystalline material at the egress end of the reaction chamber indicates an upper limit for the air flow. Rates of flow of 250 to 400 liters per hour are preferred, but good results have been obtained with rates as low as 100 or 150 liters per hour. Accordingly it may be stated in general terms that preferred flow rates lie in the range of about 100 to 400 liters of air per hour, based upon the 4-inch reaction tube that has been described herein for purposes of illustration. The carbon tetrachloride employed with this air may vary from about 300 to 500 cc. (liquid) per hour. These rates of flow of air are given in terms of its volume at room temperature (20 C.) and atmospheric pressure. Assuming an optimum reaction temperature of about 550° C. and substantially atmospheric pressure conditions in the reaction zone, these ranges for air and $CCl_4$ employed in the process may be expressed more generally, in terms of linear velocities of the gaseous mixture in the reaction zone (i. e., through an unobstructed cross-section of the reaction zone immediately following the charge), as equivalent to linear velocities of about 1.7 to 5.1 cm. per second for the admixed gases, and wherein the air/$CCl_4$ ratio in the mixture varies from about 1.3 to 3.2 by volume. Specific ratios of the gaseous components of the mixture and its linear velocities for other reaction temperatures that lie within the scope of the invention may be readily calculated from the data given herein.

Preferably, the rate of addition of the carbon tetrachloride is closely controlled. An excess does no harm as it is carried through the apparatus and condenses with the solid product, but an insufficiency seems to hinder the conversion. For charges in the neighborhood of 10 kilograms of uranium trioxide and an air flow of 200 to 400 liters per hour, about 6 cc. of liquid carbon tetrachloride per minute seems to give somewhat superior operating and conversion conditions.

There seems to be no limit on the size of the batch of raw material treated. Excellent results have been obtained with charges as small as 4 to 5 grams and as large as 10 to 15 kilograms.

The charge may be placed in a hot furnace already at running temperature, or the furnace may be heated up after the charge is in place therein, as desired. Some white fumes are generally given off at low temperatures and their disposal must be considered as a factor when the cold furnace-cold charge procedure is employed.

It is preferred that the charge be at a temperature in the range 540° to 560° C., for example 550° C., during the conversion, but it is possible to produce uranium pentachloride using temperatures as low as 425° C. Runs at the specific temperatures of about 475° and 500° C. were quite satisfactory.

It is to be particularly noted that the linear velocities of the reaction gases in the reaction zone, relative to the particle size of the charge, are such as to rapidly sweep the reaction product from the reaction zone without at the same time sweeping any substantial quantity of the charge out of the reaction zone and into the product receiver.

The term "joint" is employed to cover a readily separable gastight connection unless otherwise indicated by the context.

Although many of the advantages of the present invention will be obvious to those skilled in the art, it is desired to direct attention to the features of (1) being able to use many different types of starting material, because many available uranium compounds or mixtures of uranium compounds appear to be suitable as source material; (2) using air to obtain the desired high streaming effect; (3) employing carbon tetrachloride, a readily available, economical and easily handled material; (4) utilizing a simple, inexpensive and easily regulated apparatus; (5) bringing about a rapid and complete conversion or utilization of the raw material; and (6) obtaining the final product as a powder, a form that can be handled easily.

In résumé, a swift stream of dry air, having intermingled therewith carbon tetrachloride vapor, is passed over a body of uranium compound at a reaction temperature in the range 425° to 560° C., at a rate corresponding to approximately 100 to 400 liters of air (measured at 20° C. and atmospheric pressure) and approximately 300 to 500 cc. (liquid) carbon tetrachloride per hour through a reaction zone having a diameter of four inches, to obtain a product comprising uranium pentachloride with or without a substantial proportion of uranium hexachloride. The above ranges for air and carbon tetrachloride correspond to a range of linear velocities for the gas mixture of about 1.7 to 5.1 cm. per second calculated at a reaction temperature of about 550° C. and for a pressure in the reaction zone of substantially atmospheric, and to a range of air/CCl₄ ratios (by volume) of about 1.3 to 3.2. However, all the specific ranges of values for operating conditions that are set forth herein are primarily for the purpose of better illustrating the invention, and one may depart from them considerably without sacrificing all the advantages of the invention.

Probably many apparently widely different embodiments of this invention may be made without departing from the principle, breadth and spirit thereof, and it is to be understood that this invention is not limited to the specific embodiments thereof except as encompassed in the claims.

What is claimed is:

1. A process for producing the higher chlorides of uranium comprising passing a stream of air in admixture with carbon tetrachloride vapor in which the volumetric ratio of air/CCl₄ is about 1.3 to 3.2 and flowing at a linear velocity of about 1.7 to 5.1 cm. per second over a uranium oxide maintained at a temperature of 540° to 560° C. to react therewith yielding vapor of said higher uranium chlorides in admixture with effluent gaseous reaction products, and recovering said uranium chlorides from said effluent gaseous reaction products.

2. The process as defined in claim 1 wherein said uranium oxide comprises uranium trioxide.

3. A process for producing a higher chloride of uranium comprising passing a stream of air in admixture with carbon tetrachloride vapor in which the volumetric ratio of air/CCl₄ is about 1.3 to 3.2 and flowing at a linear velocity of about 1.7 to 5.1 cm. per second over uranium tetrachloride maintained at a temperature of about 540° to 560° C. to react therewith yielding vapor of said higher chloride of uranium in admixture with effluent gaseous reaction products, and recovering said higher uranium chloride from said effluent gaseous reaction products.

4. A process for producing a higher chloride of uranium comprising passing a stream of mixed air and carbon tetrachloride vapor in which the volumetric ratio of air/CCl₄ is about 1.3 to 3.2 and which flows at a linear velocity of about 1.7 to 5.1 cm. per second over material selected from the group consisting of uranous oxychloride, uranyl chloride, uranium dioxide, uranium trioxide, uranous uranic oxide and uranium tetrachloride and maintained at a temperature in the range 540° to 560° C. to react therewith yielding vapor of said higher chloride of uranium in admixture with effluent gaseous reaction products, and recovering said higher uranium chloride from the effluent gaseous reaction products.

5. A process for producing a chloride of uranium having more than four atoms of chlorine to each atom of uranium therein comprising reacting a uranium compound containing uranium molecularly combined with at least one element of the group consisting of chlorine and oxygen in atomic proportions of less than five atoms to each of uranium with a stream of carbon tetrachloride vapor in admixture with air in which the volumetric ratio of air/CCl₄ is in the range of about 1.3 to 3.2, which is flowing with a linear velocity of between about 1.7 to 5.1 cm. per second and at a temperature of between 425° to 560° C. yielding the vapor of said chloride of uranium in the effluent mixture of gaseous reaction products, and recovering the chloride of uranium from said gaseous reaction products.

6. The process as defined in claim 5 wherein said uranium compound which is reacted with said stream of carbon tetrachloride vapor in admixture with air comprises a compound selected from the group consisting of uranous oxychloride, uranyl chloride, uranium dioxide, uranium trioxide, uranous uranic oxide and uranium tetrachloride.

7. In a process for producing a uranium chloride compound of the group consisting of uranium pentachloride and uranium hexachloride by the reaction of carbon tetrachloride vapor with material selected from the group consisting of uranous oxychloride, uranyl chloride, uranium dioxide, uranium trioxide, uranous uranic oxide and uranium tetrachloride, the improvement comprising; conducting the reaction by passing a stream of said carbon tetrachloride vapor mixed with air in a volumetric ratio in the range of about 1.3 to 3.2, air/CCl₄ and at a linear velocity of about 1.7 to 5.1 cm. per second over said material while maintained at a temperature in the range of 425° to 560° C., whereby said uranium chloride compound is more efficaciously produced.

8. The process as defined in claim 5 wherein the temperature at which said uranium compound is maintained during the reaction of said admixture of air and carbon tetrachloride vapor is in the range of about 540° to 560° C.

COLEMAN D. WILDER.

REFERENCES CITED

The following references are of record in the file of this patent:

UNITED STATES PATENTS

| Number | Name | Date |
|---|---|---|
| 2,032,632 | Renschler et al. | Mar. 3, 1936 |

OTHER REFERENCES

Mellor: "Comprehensive Treatise on Inorganic and Theoretical Chemistry," volume 12, 1932, pages 80, 83 and 84.